United States Patent [19]
Momiyama et al.

[11] Patent Number: 4,664,485
[45] Date of Patent: May 12, 1987

[54] FINDER OPTICAL SYSTEM FOR A CAMERA

[75] Inventors: Kikuo Momiyama; Hiromi Someya, both of Kanagawa, Japan

[73] Assignee: Canon Kabushiki Kaisha

[21] Appl. No.: 375,302

[22] Filed: May 5, 1982

[30] Foreign Application Priority Data

| May 20, 1981 | [JP] | Japan | 56-76303 |
| Jun. 4, 1981 | [JP] | Japan | 56-86189 |
| Jun. 30, 1981 | [JP] | Japan | 56-102019 |

[51] Int. Cl.⁴ .............. G03B 13/02; G03B 13/08; G02B 9/12; G02B 9/14
[52] U.S. Cl. .................. 350/410; 350/474; 350/475; 354/219; 354/225
[58] Field of Search .......... 350/410, 474, 475; 354/219, 225

[56] References Cited
U.S. PATENT DOCUMENTS

| 3,582,188 | 6/1971 | Rau | 350/410 |
| 3,768,890 | 10/1973 | Osawa et al. | 350/410 |
| 4,164,369 | 8/1979 | Urano et al. | 354/219 |
| 4,206,988 | 6/1980 | Miyamoto et al. | 354/219 X |
| 4,217,048 | 8/1980 | Egawa | 354/155 |
| 4,389,097 | 6/1983 | Ohishi | 350/410 |
| 4,398,786 | 8/1983 | Neil | 350/410 X |
| 4,509,831 | 4/1985 | Nishioka | 350/410 |

FOREIGN PATENT DOCUMENTS

| 161937 | 3/1963 | U.S.S.R. | 350/410 |
| 811193 | 3/1981 | U.S.S.R. | 350/410 |

*Primary Examiner*—John K. Corbin
*Assistant Examiner*—Scott J. Sugarman
*Attorney, Agent, or Firm*—Toren, McGeady and Goldberg

[57] ABSTRACT

An eye-piece constituting part of a finder optical system in a camera is constructed from three lens components, one of which is made axially movable to effect adjusting diopter, wherein the refractive powers and forms of all the components are so properly chosen as to maintain good stability of aberration correction throughout the adjusting diopter range.

20 Claims, 73 Drawing Figures

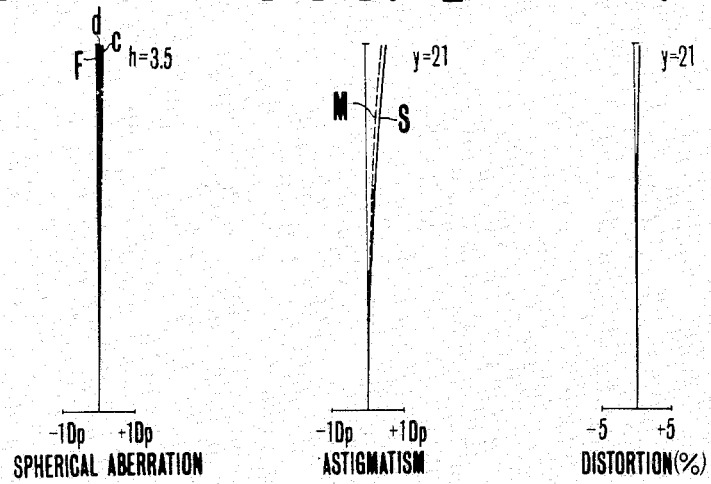
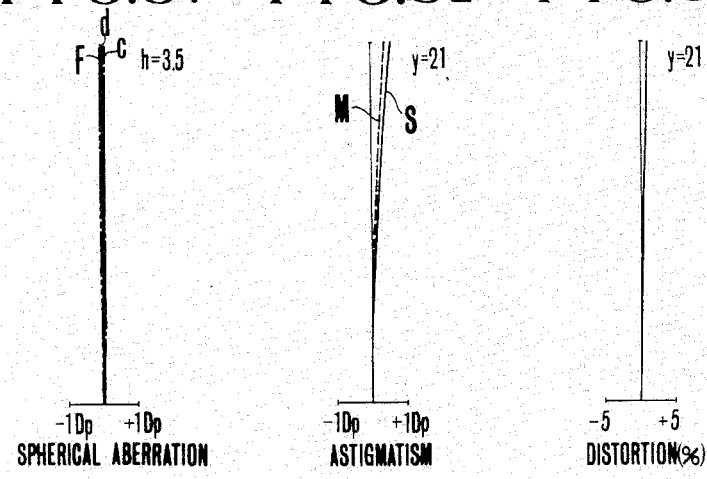
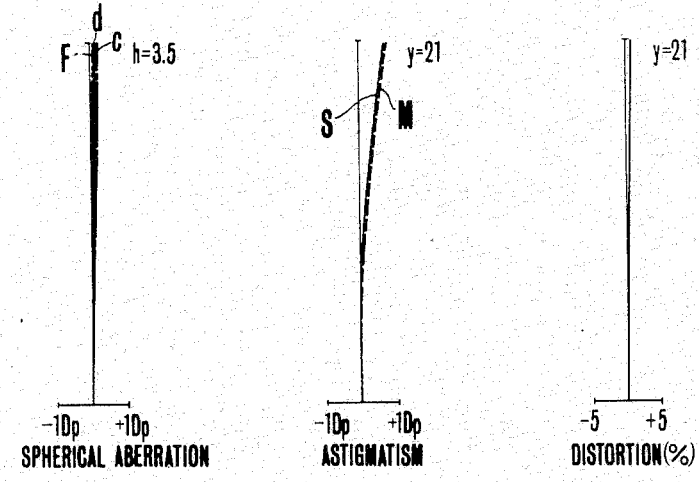

FIG.10₁  FIG.10₂  FIG.10₃
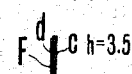
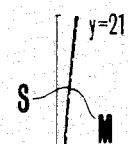
SPHERICAL ABERRATION  ASTIGMATISM  DISTORTION(%)
FIG.11₁  FIG.11₂  FIG.11₃
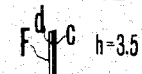
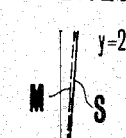
SPHERICAL ABERRATION  ASTIGMATISM  DISTORTION(%)
FIG.12₁  FIG.12₂  FIG.12₃
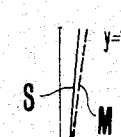
SPHERICAL ABERRATION  ASTIGMATISM  DISTORTION(%)

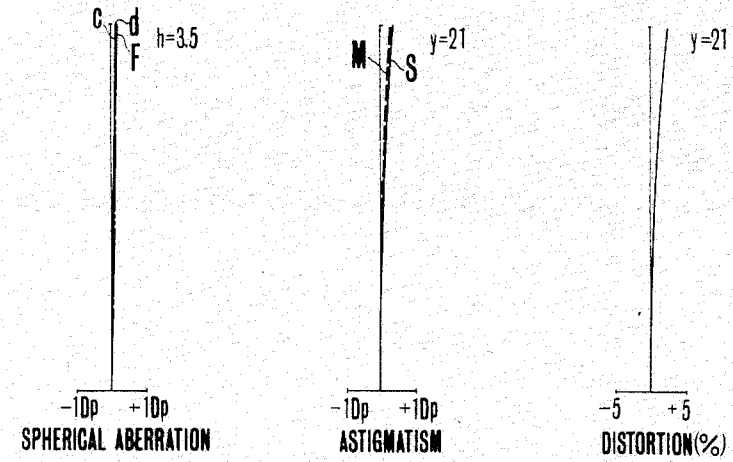
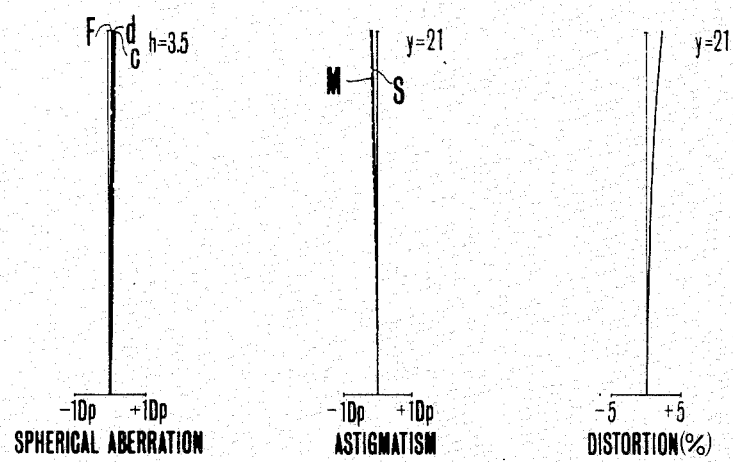
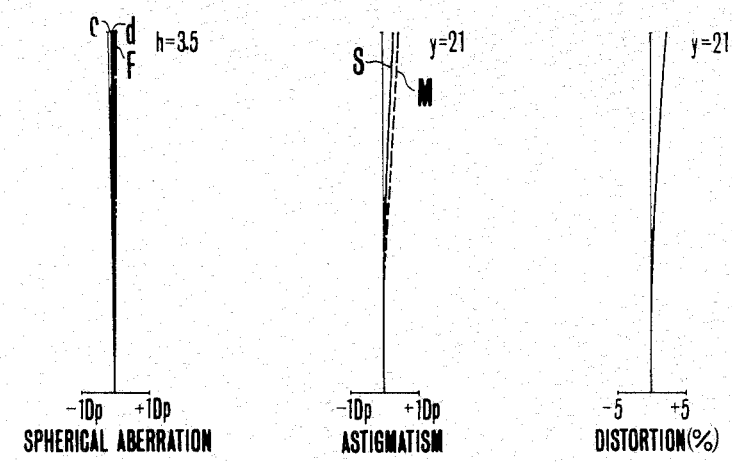

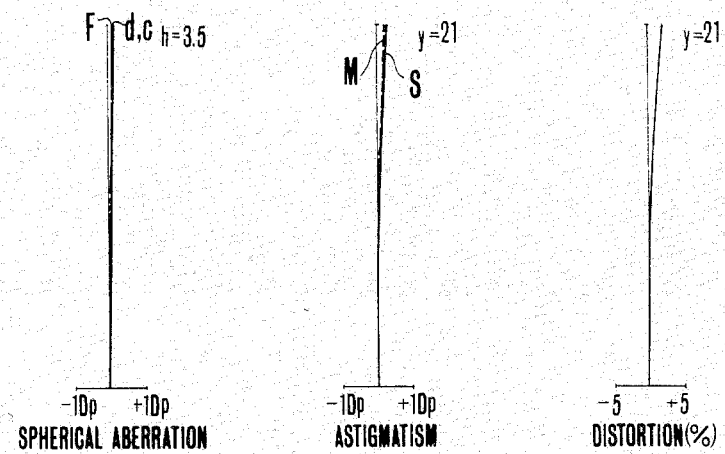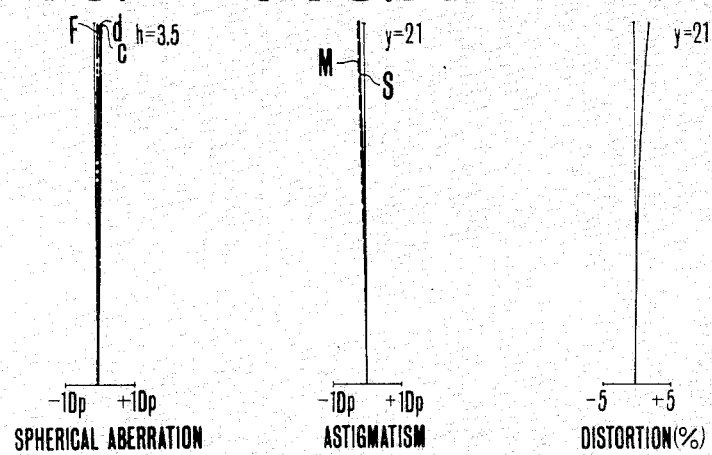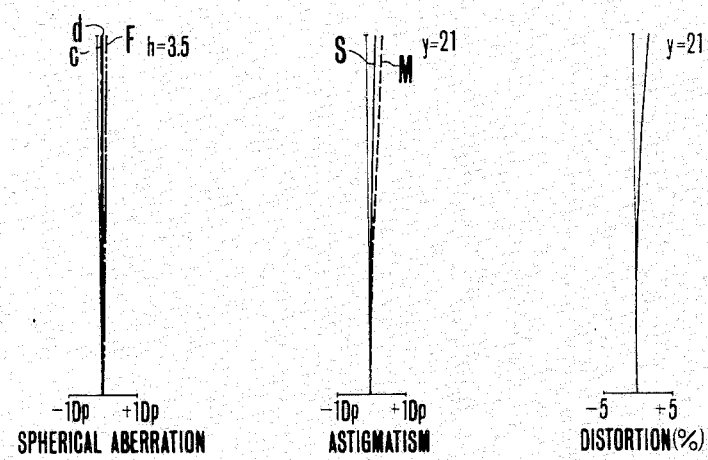

FIG.28₁ FIG.28₂ FIG.28₃
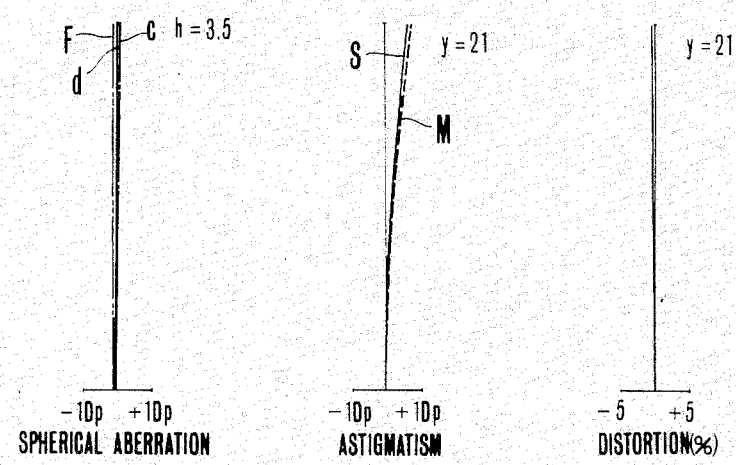
SPHERICAL ABERRATION  ASTIGMATISM  DISTORTION(%)
FIG.29₁ FIG.29₂ FIG.29₃
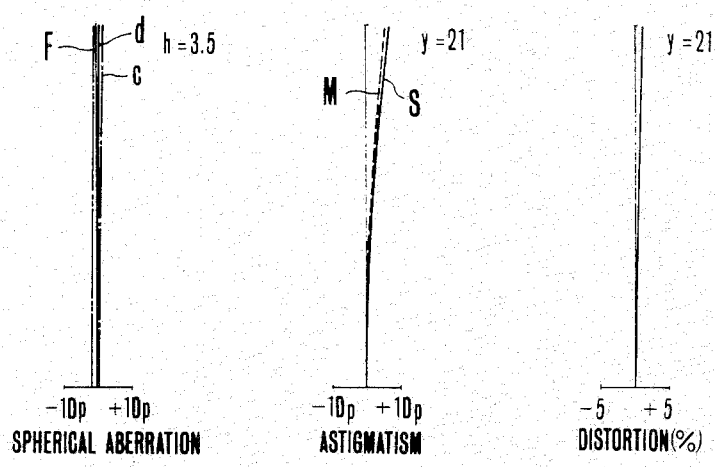
SPHERICAL ABERRATION  ASTIGMATISM  DISTORTION(%)
FIG.30₁ FIG.30₂ FIG.30₃
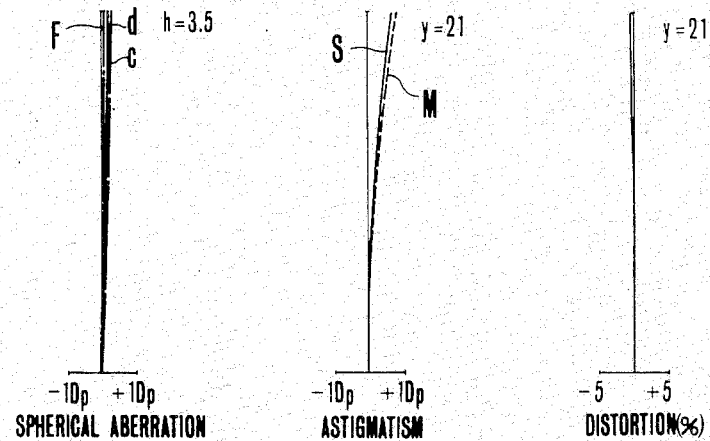
SPHERICAL ABERRATION  ASTIGMATISM  DISTORTION(%)

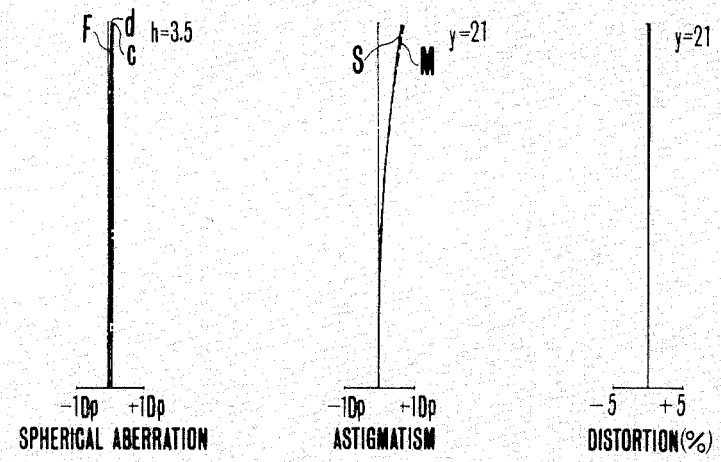
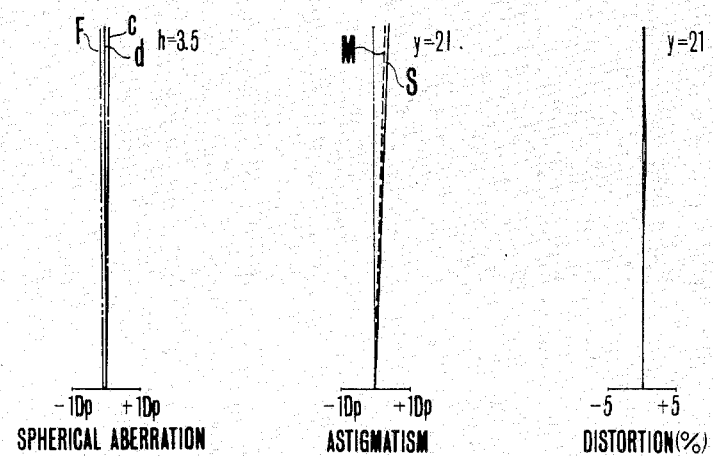
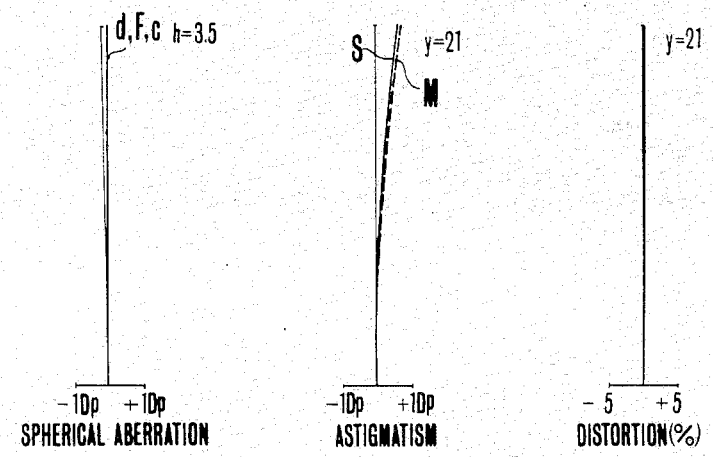

FINDER OPTICAL SYSTEM FOR A CAMERA

BACKGROUND OF THE INVENTION

1. Field of the Invention

This invention relates to eyepieces for finder optical systems in single lens reflex cameras and, more particularly, to eyepieces for finder optical systems having means for adjusting the diopter as one of the components of the eyepiece is made movable along an optical axis of the finder.

2. Description of the Prior Art

For the observation of an image of an object to be photographed through the finder optical system, it has been the general practice that the object image formed on the focusing screen is refocused at a point of about $-1$ diopter as viewed by the eyepiece through the penta dach prism. However, those of the photographers who are either quite shortsighted, or quite farsighted, or weak in the ability of adjusting diopter have difficulty in observing the object image focused at a point near $-1$ diopter by the naked eye. For this reason, the conventional finder optical systems of the single lens reflex cameras were provided with diopter adjusting lenses of different rating selectively attachable to the near of the eyepiece. Because of their inability of continuous diopter adjustment and of the eye point distance shortened when observing, the use of such attachment lens could not permit a very clear observation of the field of view to be fully assured.

On the other hand, there is known a method of continuously adjusting the diopter of the finder optical system by moving the eyepiece along the optical axis of the finder. The resultant diopter change $\Delta Dp$ may be expressed by the following formula:

$$\Delta Dp = 1000 \cdot \Delta S / fe^2$$

where fe is the focal length (mm) of the eyepiece and $\Delta S$ is the amount of axial movement of the eyepiece. In the case of the 35 mm single lens reflex camera, from the length of the optical path of the penta dach prism positioned in a space between the eyepiece and the focusing screen is determined the focal length of the eyepiece to be about 60 mm. Therefore, a desired change in the diopter calls for a large displacement of the eyepiece. To allow for this, it is required to create a large space behind the penta dach prism. For compact single lens reflex cameras, this is very difficult to achieve. For example, to effect a diopter change of $\pm 1$ diopter, the eyepiece must be moved about 7 mm.

As the method of minimizing the required amount of movement of the eyepiece, mention may be made of those proposed in Japanese Patent Application Laid Open Nos. Sho 53-149324, Sho 54-12653 and Sho 55-67732, and U.S. Pat. No. 4,217,048.

According to these proposals, the eyepiece is constructed with a singlet lens of negative power and a singlet lens of positive power in this order from the penta dach prism side, one of which is moved along the optical axis of the finder, while the other remains stationary, to thereby effect diopter adjustment. In the standard setting, however, the finder optical system has the various aberrations of large magnitude. Also as the diopter changes, the various aberrations are varied to large extent. Regarding the quality of the image to be observed through the finder, therefore, the prior art diopter adjustment device cannot be said to be sufficiently satisfactory.

SUMMARY OF THE INVENTION

It is an object of the present invention to provide an eyepiece for a finder optical system capable of diopter adjustment while still permitting good correction of aberrations to be preserved throughout.

One of the features of the present invention is the form and arrangement and construction of three lens components constituting an eyepiece such that the refractive powers and lens-figurings of all the components are so properly chosen as to perform diopter adjustment as one of the components is moved along the optical axis of the finder, while maintaining good stability of aberration correction throughout.

BRIEF DESCRIPTION OF THE DRAWINGS

FIGS. 4-1 to 3, FIGS. 6-1 to 3 are graphic representations of the various aberrations of the system of FIGS. 1 to 3 when set to $-1$, $-3$ and $+1$ in diopter respectively.

FIGS. 10-1 to 3, to FIGS. 12-1 to 3 are similar graphs of the system of FIGS. 7 to 9.

FIGS. 16-1 to 3, to FIGS. 18-1 to 3 are similar graphs of the system of FIGS. 13 to 15.

FIGS. 22-1 to 3, to FIGS. 24-1 to 3 are similar graphs of the system of FIGS. 19 to 21.

FIGS. 28-1 to 3, to FIGS. 30-1 to 3 are similar graphs of the system of FIGS. 25 to 27.

FIGS. 34-1 to 3, to FIGS. 36-1 to 3 are similar graphs of the system of FIGS. 31 to 33.

DETAILED DESCRIPTION OF THE PREFERRED EMBODIMENTS

Figure 1:
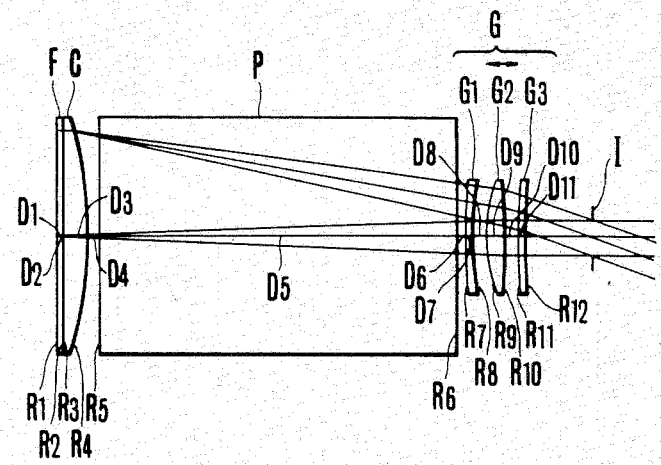
FIGS. 1 to 3 are schematic views of embodiment 1 of a finder optical system according to the present invention in three different operative positions for $-1$ diopter, $-3$ diopters and $+1$ diopter respectively.
Figure 2:
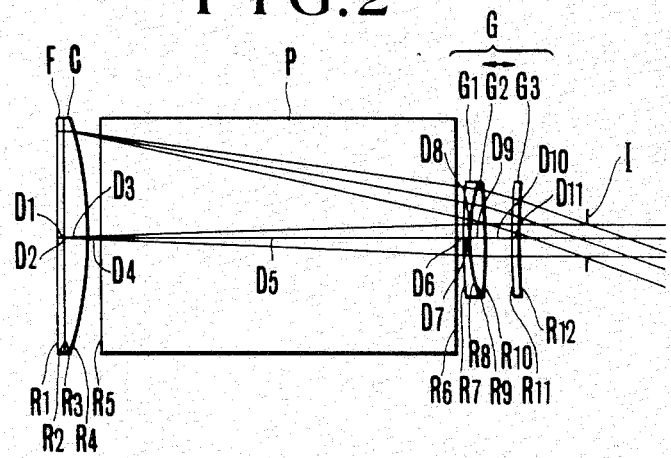
Figure 3:
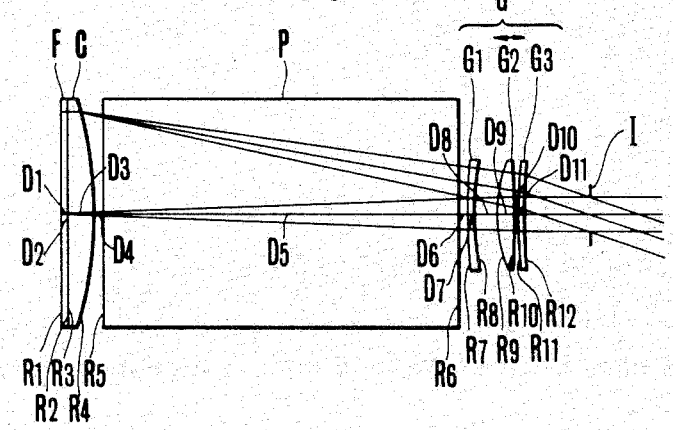
Figure 7:
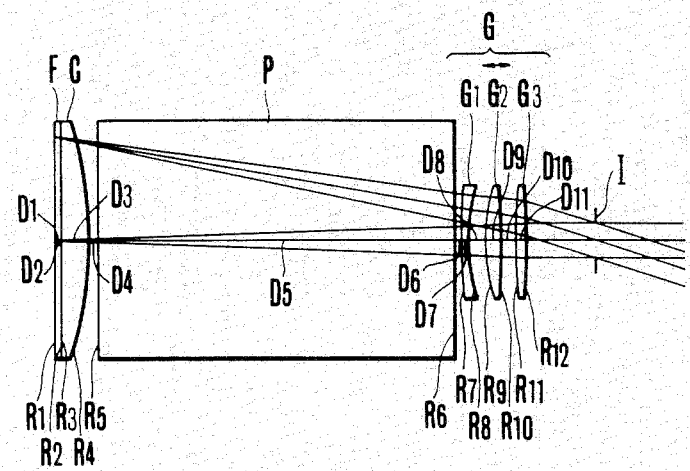
FIGS. 7 to 9 are similar views of embodiment 2 of the invention.
Figure 8:
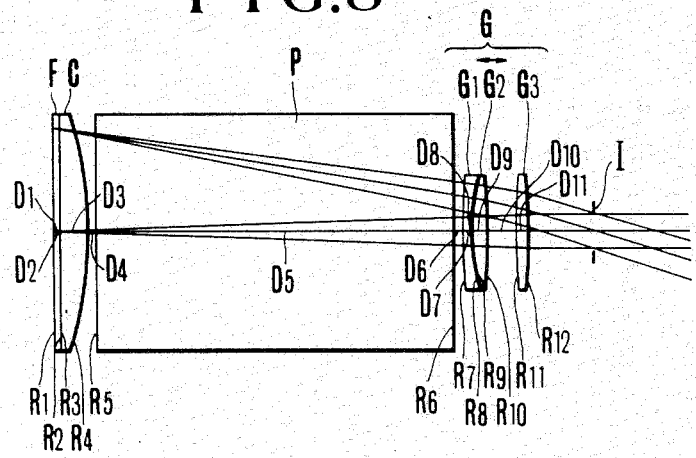
Figure 9:
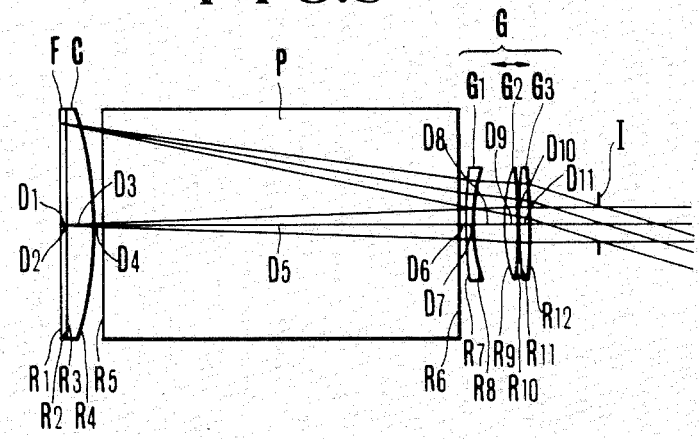
Figure 13:
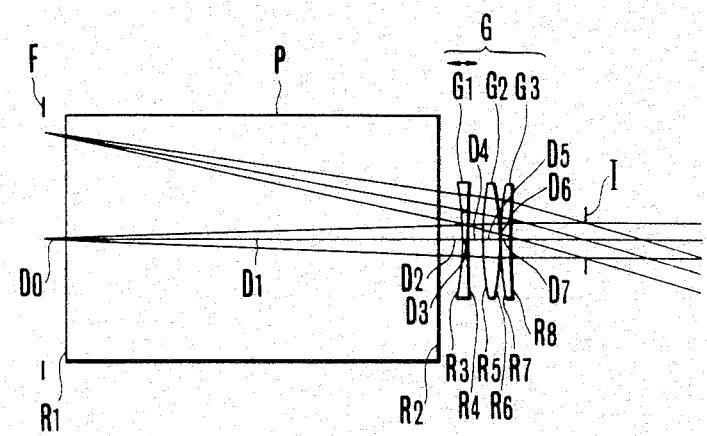
FIGS. 13 to 15 are similar views of embodiment 3 of the invention.
Figure 14:
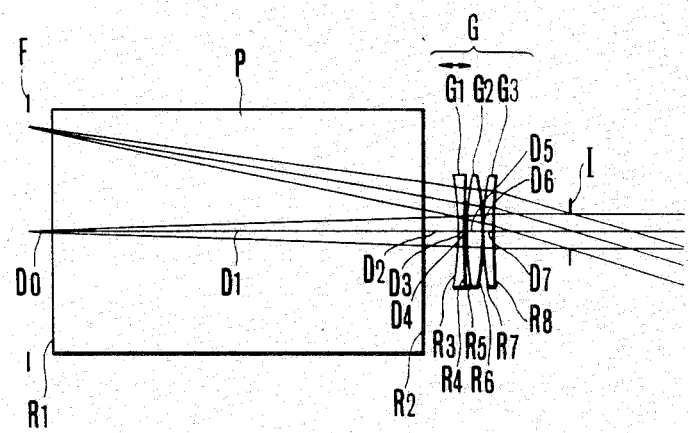
Figure 15:
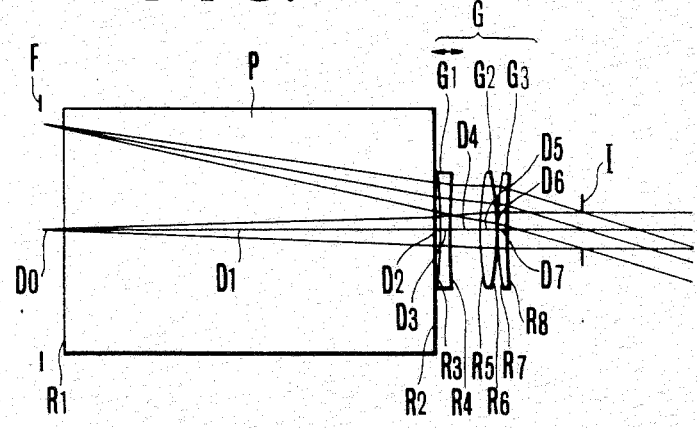
Figure 19:
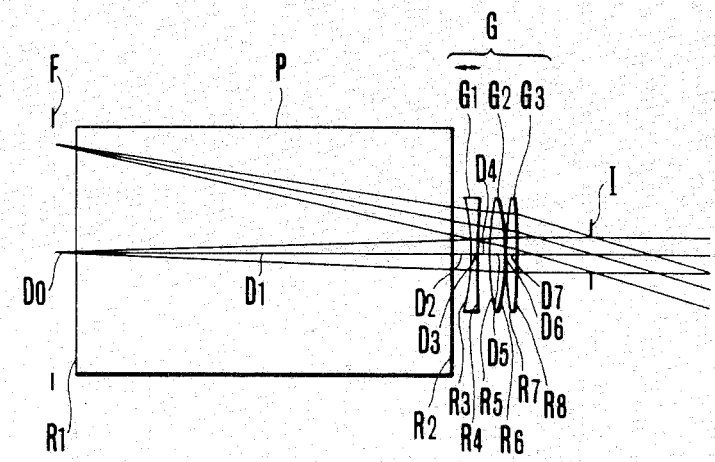
FIGS. 19 to 21 are similar views of embodiment 4 of the invention.
Figure 20:
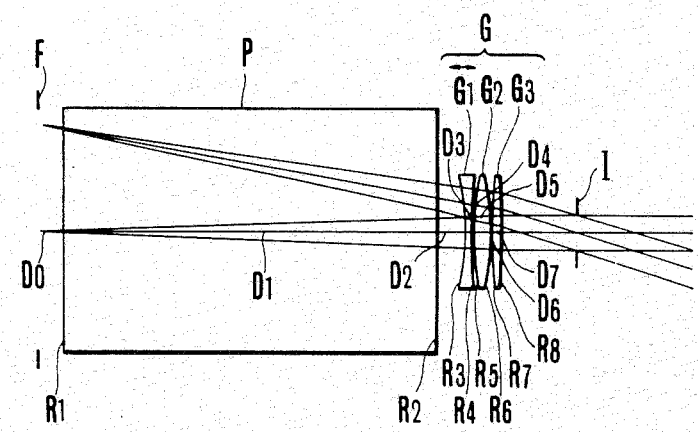
Figure 21:
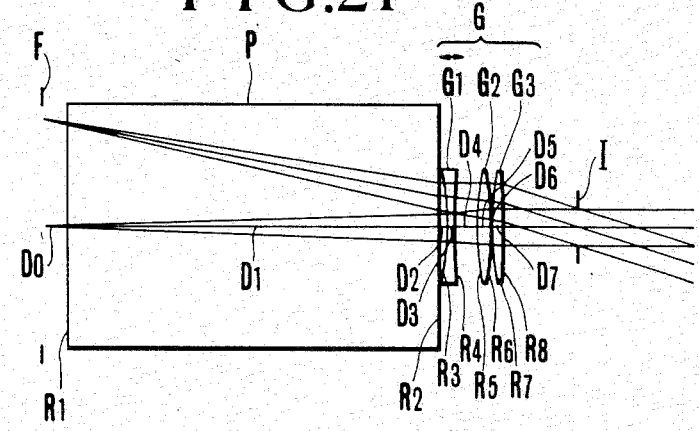
Figure 25:
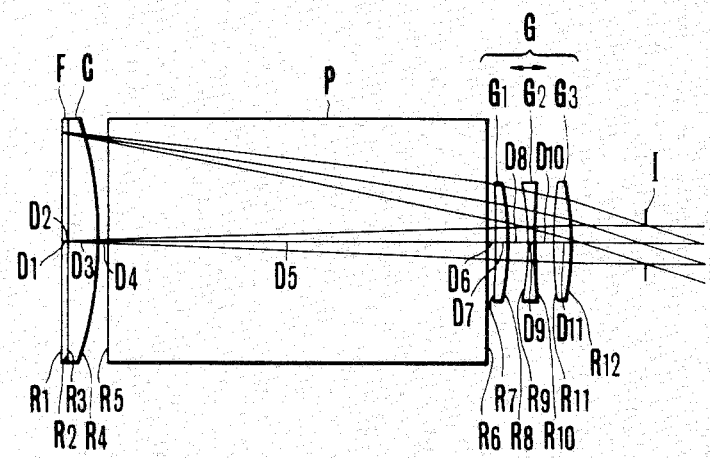
FIGS. 25 to 27 are similar views of embodiment 5 of the invention.
Figure 26:
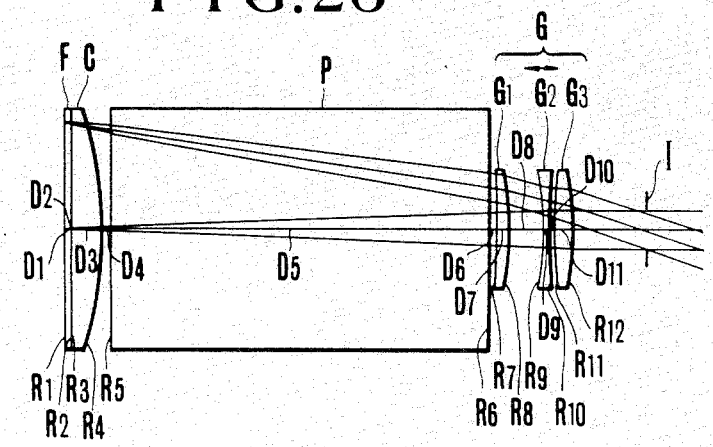
Figure 27:
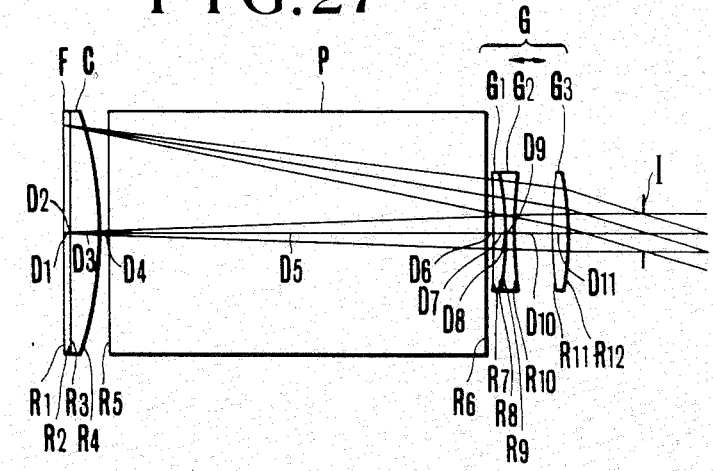
Figure 31:
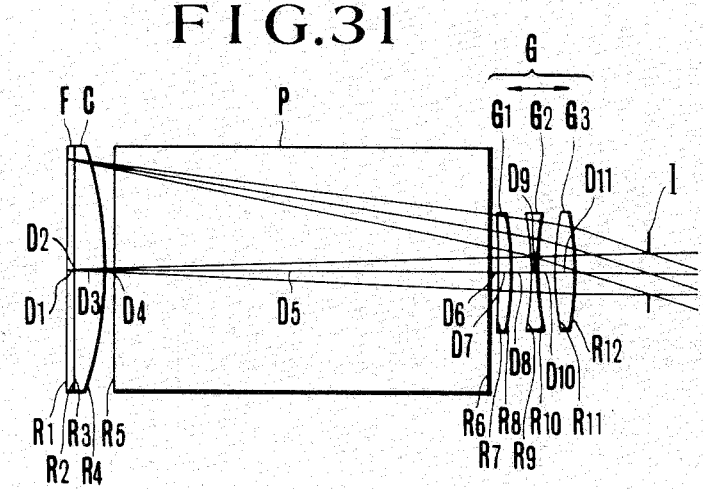
FIGS. 31 to 33 are similar views of embodiment 6 of the invention.
Figure 32:
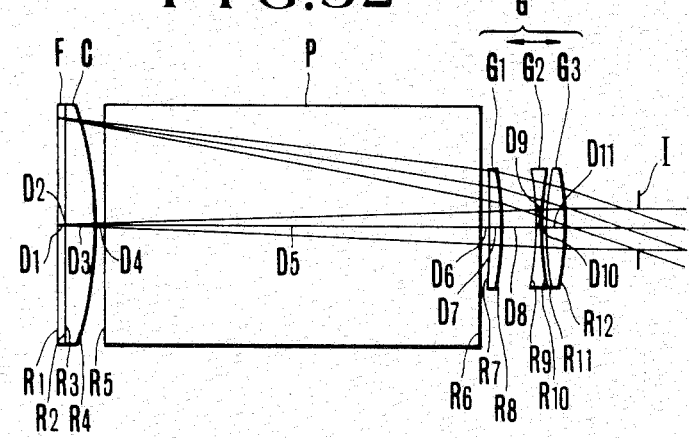
Figure 33:
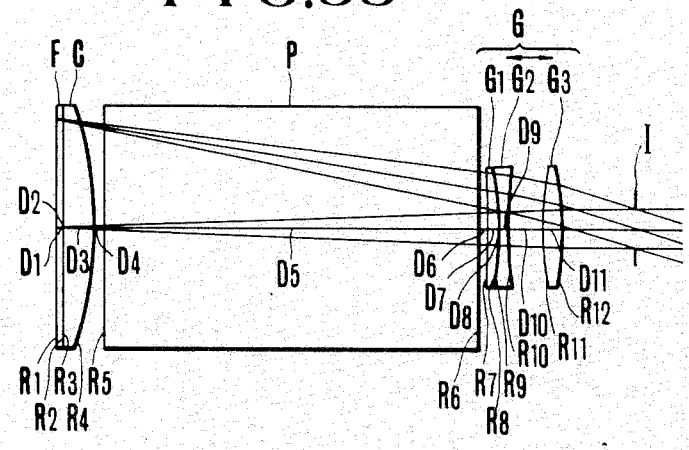
Figure 37:
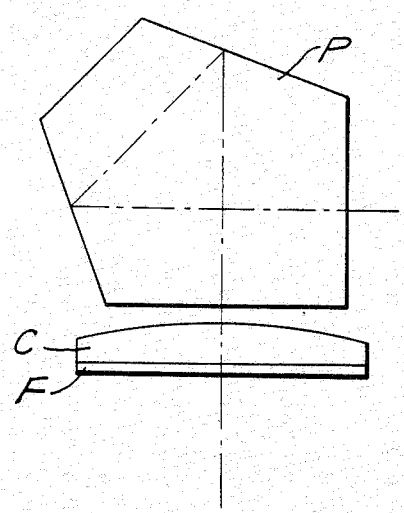
FIG. 37 is a cross-sectional view to show a portion of a finder optical system.

The present invention will next be described in connection with embodiments thereof by reference to the drawings. In each of the lens block diagrams of the finder optical system, F denotes a focusing screen or its focusing surface; C a condenser lens; P denotes a glass block equivalent to a pentagonal roof type prism which is shown in FIG. 37 and has been developed along the optical axis; and G an eyepiece in which G1 is a 1st lens component, G2 a 2nd component and G3 a 3rd component.

In embodiments 1 and 2 of the invention, the eyepiece for the finder optical system in the camera is constructed with three lens components of which the 1st counting from front, that is, from the penta dach prism side, is of negative power, the 2nd is of positive power and the 3rd is of positive powers, wherein, to effect diopter adjustment, the 2nd lens component G2 is moved along the optical axis of the finder in a space between the 1st and 3rd components G1 and G3 which remain stationary. And, letting f2 denote the focal length of the 2nd lens component and f3 the focal length of the 3rd lens component, the following condition is satisfied:

$$f2 < f3 \tag{1}$$

The conventional eyepiece for the finder was constructed with two lens components in the form of a negative singlet lens and a positive singlet lens, whereby the positive lens produced large aberrations and particularly spherical aberration of plus diopter with the result that the imaging performance of the finder was considerably damaged, and the visibility was deteriorated badly. In this regard, the eyepiece of the invention is formed from three lens components with the inclusion of two components of positive power, whereby in principle the positive spherical aberration produced by the lens components of positive power is reduced so that the eyepiece is corrected for spherical aberration at a minimum. Then, for an appropriate positive power distribution over the 2nd and 3rd lens components, the refractive power of the 2nd lens component is made stronger than that of the 3rd lens component, that is, condition (1) is set forth, whereby the total movement of the 2nd lens component for a desired range of diopter adjustment is prevented from being increased to an unduly large value. Further, the interval between the principal planes of the negative and positive lens components is prevented from being not so widened as to increase the focal length of the eyepiece with decrease in the magnification of the finder and to produce asymmetric aberrations.

To achieve a further improvement of the correction of aberrations, it is preferred to fulfill the following conditions:

$$R9 < |R10| \tag{2}$$

$$R11 < |R12| \tag{3}$$

where R9, R10, R11 and R12 are the radii of curvature of the lens surfaces of the 2nd and 3rd lens components respectively counting from the penta dach prism side.

These conditions (2) and (3) represent that within the framework of condition (1), the 2nd and 3rd lens components in the form of positive lenses are configured with their penta dach prism side surfaces to shapes of stronger curvature so that off-axis aberrations are corrected to a minimum.

Next, embodiments 1 and embodiment 2 are specified. The eyepiece G comprises, in a direction in which light advances, a 1st lens component G1 consisting of a negative singlet lens, a 2nd lens component G2 consisting of a positive singlet lens and a 3rd lens component G3 consisting of a positive singlet lens. In embodiment 1, the focal length f2 of the 2nd lens component G2 is taken at f2=46.58, and the focal length f3 of the 3rd lens component G3 at f3=193.83, since it is required that the refractive power of the 2nd lens component G2 be made stronger than that of the 3rd lens component G3. And, the 1st and 3rd lens components G1 and G3 are maintained stationary during the time when the 2nd lens component G2 is moved along the optical axis of the finder to effect diopter adjustment. In embodiment 2, the focal length f2 of the 2nd lens component G2 is taken at f2=57.77, and the focal length f3 of the 3rd lens component G3 at f3=86.51. It should be pointed out here that though embodiments 1 and 2 have been described as making the diopter adjustment provision at the 2nd lens component G2, an equivalent diopter adjustment may be otherwise formed by moving the 3rd lens component G3, if a resultant increase in the range of movement can be accounted for by a spare space within the camera housing.

Embodiments 3 and 4 of the invention have as their common lens configuration an eyepiece for the finder optical system in the camera which comprises three lens components with 1st, 2nd and 3rd ones counting from the front having negative, positive and positive refractive powers respectively, wherein the 1st lens component is made movable along the optical axis of the finder in front of the 2nd and 3rd lens components which remain stationary to effect diopter adjustment. To achieve a good stability of aberration correction throughout the diopter adjusting range, the following condition is set forth.

$$f2 < f3 \tag{4}$$

where f2 and f3 are the focal lengths of the 2nd and 3rd lens components respectively.

Since the eyepiece in these embodiments 3 and 4 is constructed from the 1st lens component of negative power and the 2nd and 3rd lens components of positive power, the positive spherical aberration produced by the lens components of positive power is advantageously reduced. Also since, at this time, for an appropriate power distribution over the two lens components, condition (4) that f2<f3 is given, the interval between the principal planes of the 1st and 2nd lens components is prevented from being very widened, or an otherwise elongaged focal length of the eyepiece would result in some loss in the image magnification of the finder. Further, production of asymmetric aberrations is prevented.

To achieve a further improvement of the state of correction of the various aberrations, it is preferred to fulfill the following conditions:

$$R5 < |R6|, R6 < 0 \tag{5}$$

$$R7 < |R8| \tag{6}$$

where R5, R6, R7 and R8 are radii of curvature of the lens surfaces of the 2nd and 3rd lens components respectively counting from the penta dach prism side.

Conditions (5) and (6) achieves within the framework of condition (3) good correction of off-axis aberrations, as the penta dach prism side surface of each of the 2nd and 3rd lens components is made stronger in curvature than the opposite surface. When any one of conditions (5) and (6) is violated, the off-axis aberrations will be objectionably poorly corrected for low grade imagery of the finder.

In embodiment 3, the focal lengths f2 and f2 of the 2nd and 3rd lens components are taken respectively at f2=48.22 and f3=140.07, thus satisfying f2<f3.

Also in embodiment 4, the focal lengths f2 and f3 of the 2nd and 3rd lens components are taken respectively at f2=46.20 and f3=88.47, thus satisfying f2<f3.

Embodiments 5 and 6 of the invention have as their common configuration an eyepiece for the finder optical system in the camera which comprises three lens components with the 1st, 2nd and 3rd lens components counting from the front having positive, negative and positive refractive powers respectively, wherein the 2nd lens component is made movable along the optical axis of the finder between the 1st and 3rd lens components which remain stationary to effect diopter adjustment. To achieve good stability of aberration correction throughout the range of variation of the eyesight, the following condition is set forth:

$$F1 > f3 \qquad (7)$$

wherein f1 and f3 are the focal lengths of the 1st and 3rd lens components respectively.

Since the eyepiece in embodiments 5 and 6 is constructed from the three lens components with the inclusion of the two positive lens components, the positive spherical aberration produced by the positive lens components is advantageously reduced. Also since, at this time, the refractive power of the 3rd lens component is made stronger than that of the 1st lens component, in other words, condition (7) that f1>f3 is fulfilled, the required total movement of the 2nd lens component for a desired range of variation of the diopter is minimized.

As regards embodiments 5 and 6, to achieve a further improvement of the state of correction of the various aberrations, it is preferred to fulfill the following condition:

$$R11 < |R12|, R12 < 0 \qquad (8)$$

where R11 and R12 are the radii of curvature of the 1st and 2nd surfaces of the 3rd lens component counting from the penta dach prism side.

Condition (8) achieves within the framework of condition (7), good correction of the various off-axis aberrations as the penta dach prism side surface of the 3rd lens component or positive lens is made stronger in curvature than the opposite. When the condition (8) is violated, the various off-axis aberrations are deteriorated badly.

In embodiment 5, the focal length f1 of the 1st lens component is taken at f1=96.60, and the focal length f3 of the 3rd lens component at f3=42.13, thus satisfying f1>f3.

In embodiment 6, the focal length f1 of the 1st lens component is taken at f1=239.8, and the focal length f3 of the 3rd lens component at f3=38.38, thus satisfying f1>f3.

Six examples of specific finder optical systems employing the respective eyepieces described above may be constructed in accordance with the numerical data given in the following tables for the radii of curvature, R, the axial thicknesses and air separations, D, and the refractive indices, N, and Abbe numbers, $\nu$, of the optical glasses from which the lens elements are made up with the usual subscripts numbered consecutively from front to rear.

EXAMPLE 1

| | | | |
|---|---|---|---|
| F { $R_1 = \infty$ | $D_1 = 1.5$ | $N_1 = 1.49171$ | $\nu_1 = 57.4$ |
| $R_2 = \infty$ | $D_2 = 0.1$ | | |
| C { $R_3 = \infty$ | $D_3 = 6.4$ | $N_2 = 1.65844$ | $\nu_2 = 50.9$ |
| $R_4 = -66.41$ | $D_4 = 1.6$ | | |
| P { $R_5 = \infty$ | $D_5 = 81.04$ | $N_3 = 1.51633$ | $\nu_3 = 64.1$ |
| $R_6 = \infty$ | $D_6 = 1.6$ | | |
| $G_1$ { $R_7 = 153.02$ | $D_7 = 1.2$ | $N_4 = 1.76182$ | $\nu_4 = 26.6$ |

-continued

| | | | |
|---|---|---|---|
| $R_8 = 37.82$ | $D_8 = $ Variable | | |
| $R_9 = 34.87$ | $D_9 = 3.3$ | $N_5 = 1.60311$ | $\nu_5 = 60.7$ |
| $G_2$ { | | | |
| $R_{10} = -139.33$ | $D_{10} = $ Variable | | |
| $G_3$ { $R_{11} = 100.08$ | $D_{11} = 1.8$ | $N_6 = 1.51633$ | $\nu_6 = 64.1$ |
| $R_{12} = \infty$ | | | |

| Variable | Diopter | | |
|---|---|---|---|
| Air Separation | −3 Dp | −1 Dp | +1 Dp |
| $D_8$ | 0.5 | 3.5 | 6.5 |
| $D_{10}$ | 6.5 | 3.5 | 0.5 |

Dp designates diopter

EXAMPLE 2

| | | | |
|---|---|---|---|
| F { $R_1 = \infty$ | $D_1 = 1.5$ | $N_1 = 1.49171$ | $\nu_1 = 57.4$ |
| $R_2 = \infty$ | $D_2 = 0.1$ | | |
| C { $R_3 = \infty$ | $D_3 = 6.4$ | $N_2 = 1.65844$ | $\nu_2 = 50.9$ |
| $R_4 = -66.41$ | $D_4 = 1.6$ | | |
| P { $R_5 = \infty$ | $D_5 = 81.04$ | $N_3 = 1.51633$ | $\nu_3 = 64.1$ |
| $R_6 = \infty$ | $D_6 = 1.6$ | | |
| $G_1$ { $R_7 = 224.15$ | $D_7 = 1.2$ | $N_4 = 1.76182$ | $\nu_4 = 26.6$ |
| $R_8 = 33.98$ | $D_8 = $ Variable | | |
| $G_2$ { $R_9 = 33.92$ | $D_9 = 3.3$ | $N_5 = 1.60311$ | $\nu_5 = 60.7$ |
| $R_{10} = 1230.93$ | $D_{10} = $ Variable | | |
| $G_3$ { $R_{11} = 81.2$ | $D_{11} = 2.5$ | $N_6 = 1.51633$ | $\nu_6 = 64.1$ |
| $R_{12} = -98.23$ | | | |

| Variable | Diopter | | |
|---|---|---|---|
| Air Separation | −3 Dp | −1 Dp | +1 Dp |
| $D_8$ | 6.9 | 3.8 | 0.5 |
| $D_{10}$ | 0.5 | 3.6 | 6.9 |

EXAMPLE 3

| | | | |
|---|---|---|---|
| | $D_0 = 5.0$ | | |
| { $R_1 = \infty$ | $D_1 = 80.0$ | $N_1 = 1.51633$ | $\nu_1 = 64.1$ |
| $R_2 = \infty$ | $D_2 = $ Variable | | |
| { $R_3 = -52.31$ | $D_3 = 1.2$ | $N_2 = 1.69895$ | $\nu_2 = 30.1$ |
| $R_4 = 153.41$ | $D_4 = $ Variable | | |
| { $R_5 = 64.01$ | $D_5 = 3.5$ | $N_3 = 1.713$ | $\nu_3 = 53.8$ |
| $R_6 = -72.60$ | $D_6 = 0.2$ | | |
| { $R_7 = 62.88$ | $D_7 = 2.0$ | $N_4 = 1.713$ | $\nu_4 = 53.8$ |
| $R_8 = 161.92$ | | | |

| Variable | Diopter | | |
|---|---|---|---|
| Air Separation | −3 Dp | −1 Dp | +1 Dp |
| $D_2$ | 8.1 | 5.0 | 1.6 |
| $D_4$ | 0.6 | 3.7 | 7.1 |

EXAMPLE 4

| | | | |
|---|---|---|---|
| | $D_0 = 5.0$ | | |
| { $R_1 = \infty$ | $D_1 = 80.0$ | $N_1 = 1.51633$ | $\nu_1 = 64.1$ |
| $R_2 = \infty$ | $D_2 = $ Variable | | |
| { $R_3 = -41.05$ | $D_3 = 1.2$ | $N_2 = 1.68893$ | $\nu_2 = 31.1$ |
| $R_4 = 95.17$ | $D_4 = $ Variable | | |
| { $R_5 = 61.74$ | $D_5 = 3.2$ | $N_3 = 1.713$ | $\nu_3 = 53.8$ |
| $R_6 = -69.10$ | $D_6 = 0.2$ | | |

-continued

| | | | |
|---|---|---|---|
| $R_7 = 88.02$ | $D_7 = 2.0$ | $N_4 = 1.713$ | $\nu_4 = 53.8$ |
| $R_8 = -220.50$ | | | |

| Variable | Diopter | | |
|---|---|---|---|
| Air Separation | $-3$ Dp | $-1$ Dp | $+1$ Dp |
| $D_2$ | 6.1 | 4.0 | 1.7 |
| $D_4$ | 0.9 | 3.0 | 5.3 |

EXAMPLE 5

| | | | |
|---|---|---|---|
| $R_1 = \infty$ | $D_1 = 1.5$ | $N_1 = 1.49171$ | $\nu_1 = 57.4$ |
| $R_2 = \infty$ | $D_2 = 0.1$ | | |
| $R_3 = \infty$ | $D_3 = 6.4$ | $N_2 = 1.65844$ | $\nu_2 = 50.9$ |
| $R_4 = -66.41$ | $D_4 = 1.6$ | | |
| $R_5 = \infty$ | $D_5 = 81.04$ | $N_3 = 1.51633$ | $\nu_3 = 64.1$ |
| $R_6 = \infty$ | $D_6 = 1.6$ | | |
| $R_7 = 276.46$ | $D_7 = 3.$ | $N_4 = 1.51633$ | $\nu_4 = 64.1$ |
| $R_8 = -60.63$ | $D_8 =$ Variable | | |
| $R_9 = -49.45$ | $D_9 = 1.2$ | $N_5 = 1.72825$ | $\nu_5 = 28.5$ |
| $R_{10} = 86.53$ | $D_{10} =$ Variable | | |
| $R_{11} = 52.53$ | $D_{11} = 4.$ | $N_6 = 1.713$ | $\nu_6 = 53.8$ |
| $R_{12} = -67.89$ | | | |

| Variable | Diopter | | |
|---|---|---|---|
| Air Separation | $-3$ Dp | $-1$ Dp | $+1$ Dp |
| $D_8$ | 7.7 | 4.4 | 0.7 |
| $D_{10}$ | 0.5 | 3.8 | 7.5 |

Dp designates diopter.

EXAMPLE 6

| | | | |
|---|---|---|---|
| $R_1 = \infty$ | $D_1 = 1.5$ | $N_1 = 1.49171$ | $\nu_1 = 57.4$ |
| $R_2 = \infty$ | $D_2 = 0.1$ | | |
| $R_3 = \infty$ | $D_3 = 6.4$ | $N_2 = 1.65844$ | $\nu_2 = 50.9$ |
| $R_4 = -66.41$ | $D_4 = 1.6$ | | |
| $R_5 = \infty$ | $D_5 = 81.04$ | $N_3 = 1.51633$ | $\nu_3 = 64.1$ |
| $R_6 = \infty$ | $D_6 = 1.6$ | | |
| $R_7 = 88.95$ | $D_7 = 2.$ | $N_4 = 1.51633$ | $\nu_4 = 64.1$ |
| $R_8 = 313.57$ | $D_8 =$ Variable | | |
| $R_9 = 339.15$ | $D_9 = 1.2$ | $N_5 = 1.72825$ | $\nu_5 = 28.5$ |
| $R_{10} = 33.81$ | $D_{10} =$ Variable | | |
| $R_{11} = 33.99$ | $D_{11} = 4.$ | $N_6 = 1.713$ | $\nu_6 = 53.8$ |
| $R_{12} = -133.35$ | | | |

| Variable | Diopter | | |
|---|---|---|---|
| Air Separation | $-3$ Dp | $-1$ Dp | $+1$ Dp |
| $D_8$ | 7.3 | 4.2 | 0.7 |
| $D_{10}$ | 0.7 | 3.8 | 7.3 |

Dp designates diopter.

What is claimed is:

1. A finder optical system for a camera comprising: a focusing screen; a prism; and an eyepiece for observing through said prism an image formed on said focusing screen, said eyepiece having a first positive lens component, a second negative lens component and a third positive lens component, only one of said lens components being made to move to adjust the visual acuity.

2. A finder optical system according to claim 1, wherein said lens components each is constructed in the form of a singlet.

3. A finder optical system according to claim 1, wherein said eyepiece satisfies the inequality:

$$f1 > f3$$

wherein f1 and f3 are the focal lengths of said second and third lens components respectively.

4. A further optical system according to claim 3, wherein said eyepiece satisfies the inequalities:

$$R11 < |R12|, R12 < 0$$

wherein R11 and R12 are the radii of curvature of the front and rear surfaces of said third lens component respectively.

5. A finder optical system according to claim 1, wherein said lens components each is constructed in the form of a singlet.

6. A finder arrangement for a camera comprising:
   (a) a prismatic apparatus having an optical path; and
   (b) an eyepiece consisting of a first lens component having a negative power, a second lens component having a positive power, and a third lens component having a positive power, being positioned in said order on said optical path;
   wherein said second lens component is adjustable for varying a diopter of said finder arrangement.

7. A finder arrangement according to claim 6, wherein said adjustable lens component is a single lens.

8. A finder arrangement according to claim 6, wherein the focal length f2 of said second lens component is smaller than the focal length f3 of said third lens component.

9. A finder arrangement according to claim 8, wherein said second lens component and said third lens component respectively consist of a single lens, and the radius of curvature of the front surface of said single lens is smaller than the absolute value of the radius of curvature of the rear surface of the same.

10. A finder arrangement for a camera comprising:
    (a) a prismatic apparatus having an optical path; and
    (b) an eyepiece consisting of a first lens component having a positive power, a second lens component having a negative power, and a third lens component having a positive power, being positioned in said order on said optical path;
    wherein said second lens component is adjustable for varying a diopter of said finder arrangement.

11. A finder arrangement according to claim 10, wherein the focal length f1 of said first lens component is larger than the focal length f3 of said third lens component.

12. A finder arrangement for a camera comprising:
    (a) a prismatic apparatus having an optical path; and
    (b) an eyepiece consisting of a first lens component having a negative power, a second lens component having a positive power, and a third lens component having a positive power, being positioned in said order on said optical path;
    wherein the focal length f2 of said second lens component is smaller than the focal length f3 of said third lens component, and said first lens component is adjustable for varying a diopter of said finder arrangement.

13. A finder arrangement according to claim 12, wherein said second lens component and said third lens component are respectively made of a single lens, and the radius of curvature of the front surface of said single lens is smaller than the absolute value of the radius of curvature of the rear surface of the same.

14. A finder optical system for a camera comprising:
    a focusing screen;
    a prism; and an eyepiece for observing through said prism an image formed on said focusing screen, said eyepiece having a first negative lens component, a second positive lens component and a third positive lens component, only one of said lens components being made to move to adjust the visual acuity, wherein said eyepiece has said first lens component made movable and wherein said eyepiece satisfies the inequalities:

$R5 < |R6|, R6 < 0$ $R7 < |R8|$ wherein R5, R6, R7 and R8 are the radii of curvature of the refracting surfaces of said second and third components with the subscripts numbered from the front respectively.

15. A finder optical system according to claim 14, wherein said eyepiece has said first lens component, said second lens component and said third lens component being arranged in this order from the front.

16. A finder optical system according to claim 15, wherein said eyepiece satisfies the inequality:

$f2 < f3$ wherein f2 and f3 are the focal lengths of said second and third components respectively.

17. A finder optical system according to claim 16, wherein said eyepiece has said second lens component made movable.

18. A finder optical system according to claim 17, wherein said eyepiece satisfies the inequalities:

$R9 < |R10|$ $R11 < |R12|$ wherein R9, R10, R11 and R12 are the radii of curvature of the refracting surfaces of said second and third components with the subscripts numbered from the front respectively.

19. A finder optical system according to claim 18, wherein said lens components each is constructed in the form of a singlet.

20. A finder optical system according to claim 14, wherein said prism is a pentagonal prism.

* * * * *